United States Patent [19]

Barnscheidt

[11] 4,347,128
[45] Aug. 31, 1982

[54] FLOTATION APPARATUS FOR DE-INKING PULP SUSPENSIONS

[75] Inventor: Wolfgang Barnscheidt, Dormagen-Straberg, Fed. Rep. of Germany

[73] Assignees: Feldmühle Aktiengesellschaft, Fed. Rep. of Germany; E. & M. Lamort S.A., France

[21] Appl. No.: 252,067

[22] Filed: Apr. 8, 1981

[30] Foreign Application Priority Data

Apr. 9, 1980 [DE] Fed. Rep. of Germany ....... 3013655
Apr. 26, 1980 [DE] Fed. Rep. of Germany ....... 3015788

[51] Int. Cl.$^3$ .............................................. B03D 1/24
[52] U.S. Cl. ...................................... 209/170; 261/77; 261/DIG. 75; 210/221.2; 239/119; 239/430
[58] Field of Search ............... 162/4, 5; 209/168, 170; 210/221.2; 261/DIG. 75, 76, 62, 77; 239/428–430, DIG. 18, 110, 310, 318, 414, 415, 112–119; 366/11, 173

[56] References Cited

U.S. PATENT DOCUMENTS

| | | | |
|---|---|---|---|
| 1,429,415 | 9/1922 | Evans | 239/113 |
| 2,140,903 | 12/1938 | Fisk | 239/119 |
| 2,562,096 | 7/1951 | Herrmann | 261/76 X |
| 3,371,618 | 5/1968 | Chambers | 261/DIG. 75 |
| 3,752,398 | 8/1973 | Svensson | 239/112 X |

FOREIGN PATENT DOCUMENTS 2836496  2/1980  Fed. Rep. of Germany .

Primary Examiner—Ralph J. Hill
Attorney, Agent, or Firm—Toren, McGeady & Stanger

[57] ABSTRACT

Flotation apparatus for de-inking of pulp suspension in a flotation cell with injectors for feeding the pulp suspension into the cell and for aerating the pulp suspension. The injectors are equipped with wide slot nozzles through which the suspension flows having a ratio of cross-sectional area to periphery of between 1.5 mm and 4.0 mm. A mixing chamber receiving pulp suspension flow from the wide slot nozzles is provided having a cross-sectional area which is between 1.3 to 1.7 times the cross-sectional area of the wide slot nozzles.

8 Claims, 6 Drawing Figures

FLOTATION APPARATUS FOR DE-INKING PULP SUSPENSIONS

The present invention relates generally to de-inking of pulp suspensions and more particularly to a flotation apparatus for this purpose.

The present invention generally relates to apparatus which is essentially comprised of a flotation cell which may have an annular configuration within which injectors are provided in order to feed into the cell, to circulate within the cell, and to aerate a pulp suspension which is to be treated within the cell.

Annular flotation cells of the type to which the present invention relates are known from German Offenlegungsschrift No. 28 36 496 and German Auslegeschrift No. 29 14 392. In arrangements of this type, the pulp suspension is of waste paper and before entering the actual flotation cell, it is loaded with air bubbles in pulp injectors and is fed through a nozzle into the annular cell. The fine air bubbles rise upwardly through the pulp suspension. Printing ink and other impurities deposit on the air bubbles and form a foam layer on the surface of the pulp suspension. The foam, which is laden with impurities, is then drawn off from the surface of the suspension by means of suction nozzles. Fibers which have undergone this preliminary purification will sink downwardly and they are removed also in the form of a suspension and they may be again laden with air which is fed in through nozzles by the injectors.

Units of this type are very efficient and have been found to have an excellent purifying effect. However, these units have displayed some deficiencies. For example, they require a considerable number of injectors because the diameter of these injectors can be only very small for reasons of air loading. Furthermore, the nozzles are relatively easily obstructed due to the small dimensional size thereof. The obstructed nozzles must be disassembled and blown out, which is not overly complicated but which, however, requires a certain mechanical skill. Therefore, skilled personnel must be made available for such an operation.

The present invention is directed toward the task of reducing the number of nozzles needed in a given type of flotation cell without imparting the quality of the air loading of the pulp suspension. Additionally, the invention seeks to provide a construction which will avoid the nozzles becoming obstructed and which will eliminate to a great extent the waiting time which results from the necessity for eliminating such obstructions.

SUMMARY OF THE INVENTION

Briefly, the present invention may be described as flotation apparatus for de-inking pulp suspensions comprising a flotation cell which may have an annular configuration with injectors in the cell for feeding, circulating, and aerating the pulp suspension, the injectors being particularly characterized in that they are equipped with wide slot nozzles having a ratio of cross-sectional area to circumference of between 1.5 mm and 4.0 mm, with the cross-section of a mixing chamber from which the flow of suspension is fed to the wide slot nozzles being between 1.3 to 1.7 times the cross-sectional area of the wide slot nozzle.

The pulp suspension which is to be purified consists of waste paper which has been chemically and physically separated to such an extent that the suspension no longer contains coarse impurities and which has been decomposed into individual fibers of the paper constituents. However, dyestuff essentially in the form of pigments which must be removed continues to adhere to these fibers.

The length of the fibers corresponds to the usual length of paper fibers, i.e., the length is less than 6 mm and usually between 3 and 0.5 mm.

In round nozzles there exists the danger that fiber bundles which have not been completely separated will agglomerate in the narrowest cross-sectional area of the nozzle and therefore obstruct the nozzle. However, this danger is prevented to a great extent in flat nozzles which have a significantly greater extension in the width thereof. The flat nozzle configuration has a slot width which is less than the diameter of the round nozzle but which, however, extends by a multiple in the width so that it may practically ensure flushing through of any possible fiber bundles.

The ratio of the cross-sectional area to the circumference of the nozzle outlet is of considerable significance and is dimensioned to be between 1.5 mm and 4.0 mm, preferably between 2.0 mm and 2.5 mm. Adjoining this narrowest cross-sectional area of the nozzle is an expanded cross-sectional area in the form of a step, the mixing chamber cross-sectional area being between 1.2 to 1.7 times larger than the narrowest cross-sectional area. Advantageously, the cross-sectional area of the mixing chamber is 1.3 to 1.4 times the narrowest cross-sectional area. As a result of the selection of the ratio between the cross-sectional area and the circumference, there may be determined the surface of the pulp suspension jet which emerges from the nozzle which comes in contact with air. The amount of air available is determined by the selection of the air suction cross-sectional area, i.e., the size of the step. Since the injector operates as a water-jet pump, a vacuum pressure forms in the air suction cross-sectional area and this vacuum pressure is equalized by means of a connecting bore to the atmosphere. The air which is drawn in mixes with the pulp suspension as it flows through the injector wherein the size of the step, i.e., the ratio of the narrowest cross-sectional area of the nozzles relative to the cross-sectional area of the mixing chamber, not only determines the amount of air which is to be supplied, but determines at the same time in connection with the pressure of the pulp suspension which flows therethrough the size of the air bubbles which are formed in the injector.

In an advantageous embodiment of the invention, it is provided that the total of the cross-sectional areas of all of the aeration bores is 1.1 to 1.4 times the air suction cross-sectional area of the mixing chamber. It is to be understood that the air suction cross-sectional area is intended as that area which results from subtracting the narrowest nozzle cross-sectional area from the cross-sectional area of the mixing chamber. The total cross-sectional area which advantageously lies between 1.2 and 1.4 ensures that sufficient air can be supplied to the air suction cross-sectional area even if there are friction losses and that even if individual aeration bores are obstructed, the required amount of air will nevertheless be available.

The aeration bores are advantageously installed at an angle of 30° to 60° with respect to the direction of flow, i.e., the angle as viewed in the flow direction is 30° to 60° whereby a substantially tangential air supply is provided to the pulp suspension which flows through the injector and consequently good air distribution in the mixing chamber results.

In a further preferred embodiment of the invention, the wide slot nozzle, the discharge of the aeration bores into the mixing chamber, and at least a partial region of the mixing chamber are arranged within an insert which is mounted in the injector.

In treating the pulp suspension, there arises the danger that individual fibers will adhere to each other and thus form fiber bundles which will obstruct the nozzle. In order to eliminate these obstructions, it is usually necessary to disassemble the injector. That is, the injector must be arranged between two valves which shut off the pulp suspension feed on one side and prevent emergence of the pulp suspension from the flotation container on the other side. Placing of the parts which are essential for aeration in a separate insert gives rise to an advantage in that the pulp suspension may be shut off without requiring disassembly and the nozzles and the feed pipes may be cleaned.

The insert may be constructed as a prismatic column which slides in the casing of the injectors wherein the operative range of this column contains the injection nozzle as well as a part of the mixing chamber as the air suction openings so that by simply inserting the part of the column which has no openings and projects from the injector casing, the connection from the nozzle feed pipe to the flotation vessel is interrupted. At the same time, that part of the column which has the openings is pushed out of the injector and thus may be cleaned from the outside without difficulty.

An especially advantageous embodiment may be provided by constructing the insert as a rotary cylinder or truncated one. This arrangement makes it possible to interrupt the connection from the pulp suspension feed pipe to the flotation vessel simply by rotating the insert and to bring the nozzle into a position in which it can be cleaned through openings in the casing. The insert here has the same function as a faucet plug in a stop cock, i.e., the interruption of the flow of suspension. However, at the same time the insert makes possible access to the nozzle after the rotary process and the nozzle may then be cleaned with compressed air or pressurized water. In the design as a prismatic column as well as a slide, i.e., whether the insert is constructed as a cylinder or truncated cone, there is the advantage that installation of separate valves before and after the injector may be omitted. Additionally, disassembly of the injector for cleaning purposes is not necessary and a simply rotary movement or pushing is sufficient to expose the nozzle and at the same time interrupt the flow of pulp suspension.

The conical shape of the insert is preferred for reasons of sealing. When wear occurs, this shape makes readjustment possible in a manner similar to a faucet plug and sealing with respect to the casing is again ensured.

Another embodiment of the invention provides that the convergent nozzle feed pipes and the diffuser are a part of the casing. It is of course also possible to construct the entire injector as an insert, i.e., for instance, to embed it in a so-called faucet plug. This, however, results in considerable dimensions which do not permit economical manufacturing. Therefore, it is practical to only arrange that part in an insert which could possibly become obstructed and which must be cleaned from the outside.

The casing of the injector is provided with openings for cleaning of the injection nozzle and it is advantageous also to clean the air suction bores through these openings. By rotating the column in one direction, the mixing chamber is connected with a cleaning opening, i.e., a blast opening. Simultaneously, the diffuser attachment is connected with the outlet opening and the discharge of the air suction bores is connected with additional outlet openings. The pulp feed pipe is simultaneously interrupted and the connection to the flotation cell is closed. In this position, the nozzle may be flushed out with compressed air or pressurized with water. Mechanical cleaning by means of a wire, a piece of wood, etc. may also take place.

In accordance with a further preferred embodiment of the invention, the casing is provided with stops for the operative position and the cleaning position of the insert. These stops will prevent the unintentional complete removal from the opening of the insert during sliding movement, i.e., when the insert is constructed as a prismatic column. When the insert is constructed as a cylinder or truncated cone, the stops serve to limit the swivel motion. In this manner, it is ensured that an air suction bore will not be inadvertently connected with the pulp feed pipe or the flotation chamber and the pulp suspension will additionally enter into the nozzle region or will be pressed out through these bores.

In accordance with the invention, the casing is provided with a locking mechanism for the insert so that the insert can be locked in the operative position. This locking mechanism is important because in this manner an unintentional movement thereof during feeding of the pulp suspension through the nozzle is prevented. Also, small movements are prevented by means of which the edges of the diffuser immerse into the liquid stream and thus lead to turbulence wherein at the same time the bores of the insert no longer align with the bores in the casing so that a reduced air suction results.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
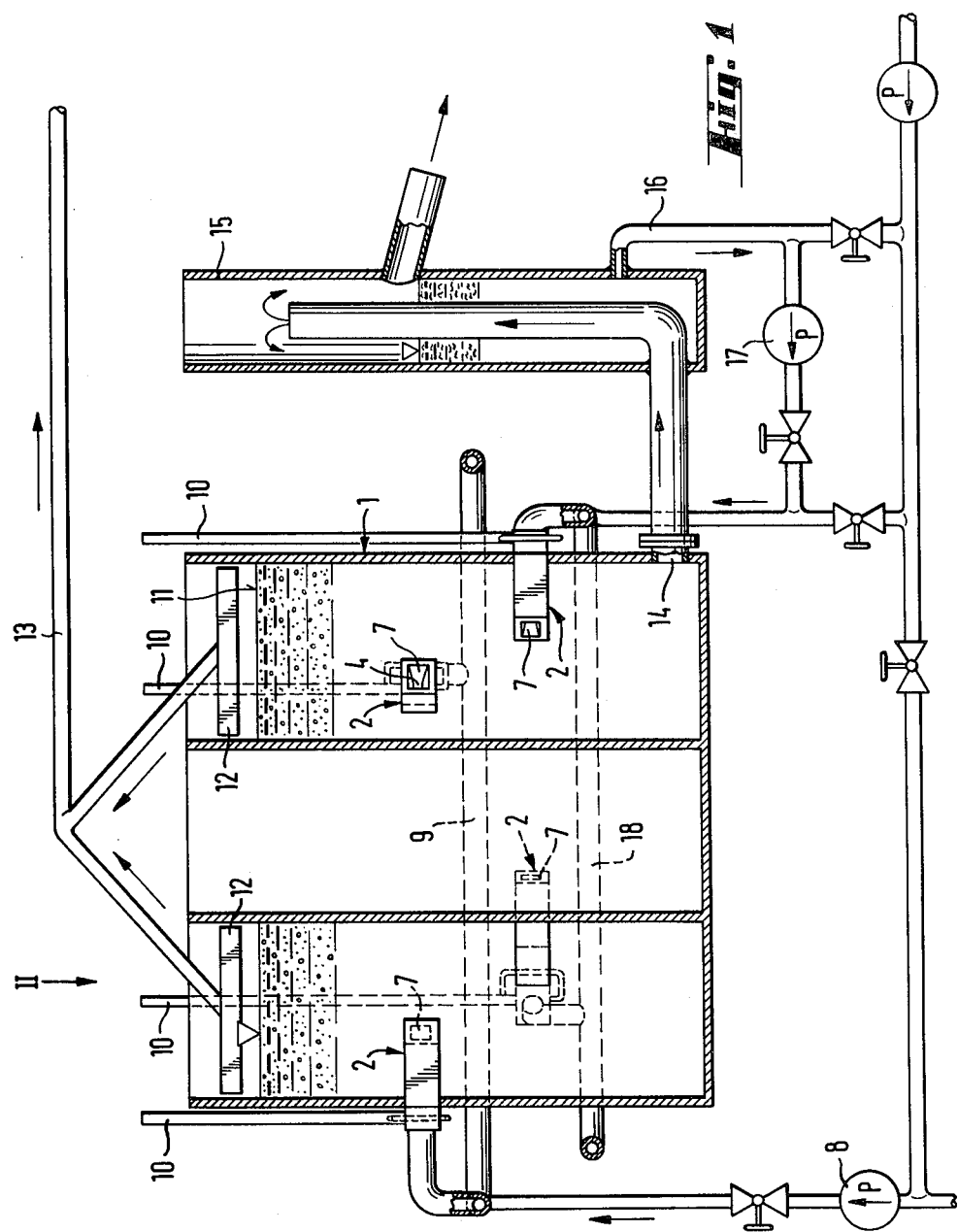
FIG. 1 is a sectional elevation of de-inking apparatus in accordance with the invention.
Figure 2:
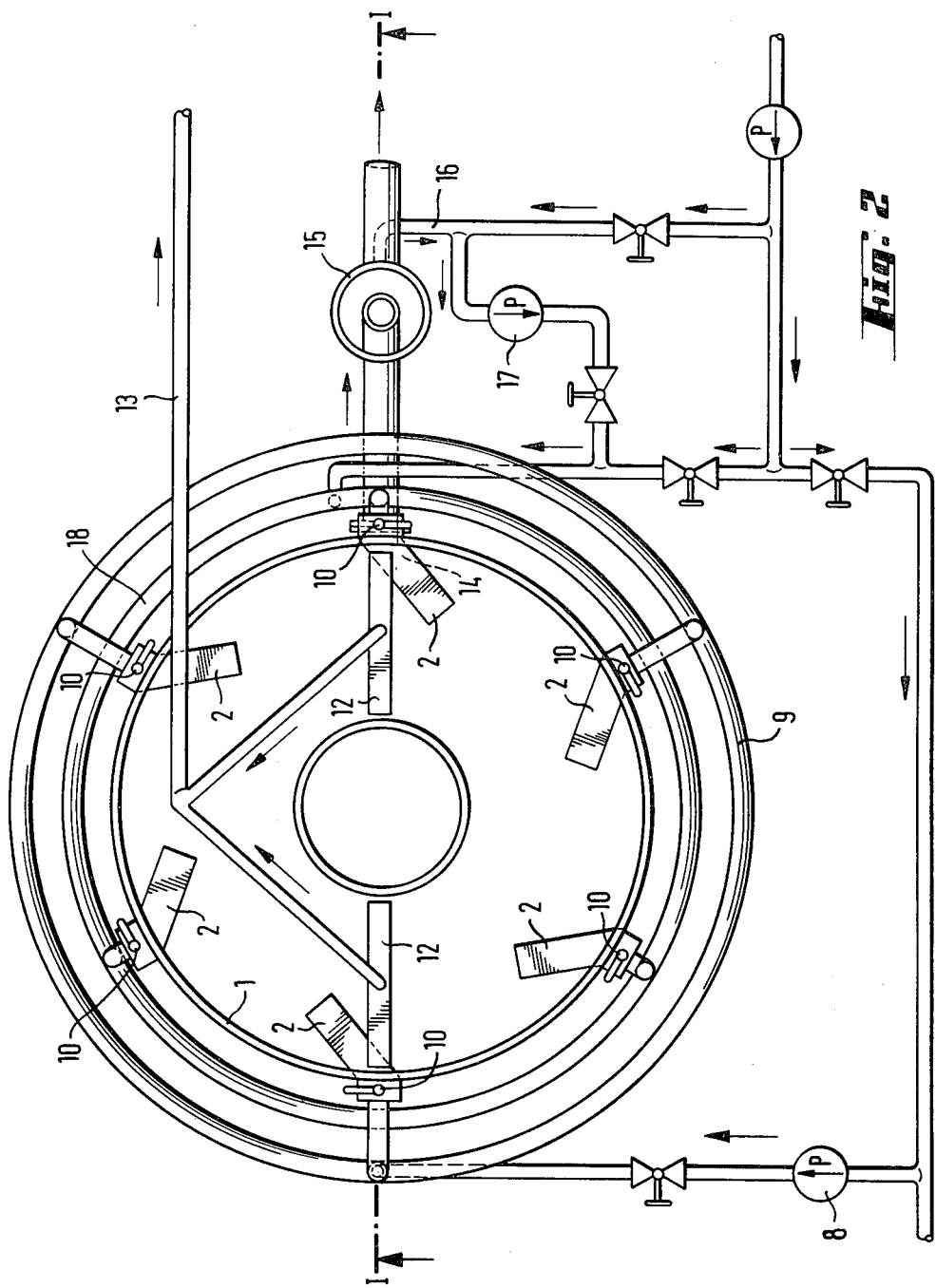
FIG. 2 is a top view of the de-inking apparatus shown in FIG. 1.
Figure 3:
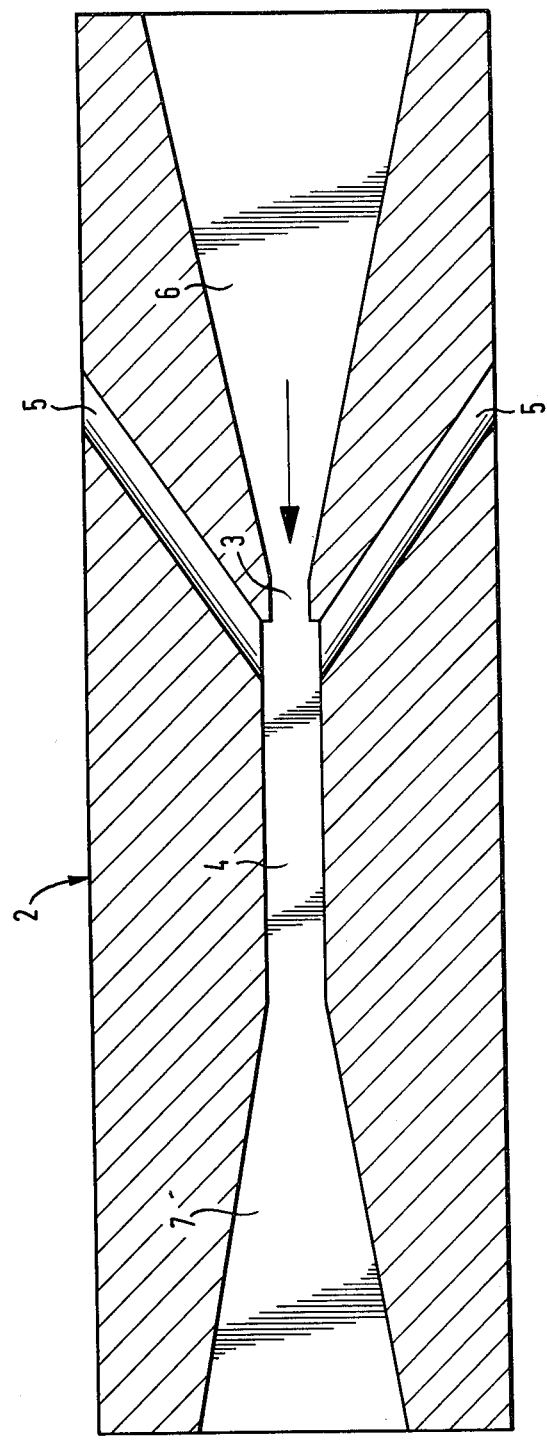
FIG. 3 is a sectional view through the injector of the invention.

Referring now to the drawings wherein similar reference numerals are used to identify like parts throughout the various figures thereof, in the apparatus in accordance with the present invention depicted in FIGS. 1 and 2, pulp suspension is fed by means of a pump 8 to a circular pipeline 9. At the circular pipeline 9 the pulp suspension is distributed over the periphery of a flotation cell 1 by injectors 2 which are arranged in the cell 1 and which are formed with wide slot nozzles 3.

Aeration lines 10 which project beyond the height of the liquid level 11 in the cell 1 are connected with the injectors 2. The injectors 2 draw in air through these aeration lines 10 and the air together with the pulp suspension is delivered into the flotation cell 1. In the flotation cell 1, the air rises through the pulp suspension in the form of air bubbles and a dirty foam is caused to float on the surface 11 of the liquid. This foam may be drawn off by suction nozzles 12 through a suction line 13 through which it is removed.

Purified material is withdrawn through a discharge opening 14 and delivered to an overflow chamber 15. From the overflow chamber 15, a partial amount of the pulp suspension is drawn off through a circulation line 16 and delivered by means of a cycle pump 17 to an inner circular pipeline 18.

Injectors 2 of the type connected at the circular line 9 are also connected to the inner circular line 18 and these injectors are joined with the aeration lines 10. The precleaned pulp suspension is again laden with air in these injectors which then comes through the flotation cell 1 in the form of air bubbles, in the manner previously described.

Figure 4:
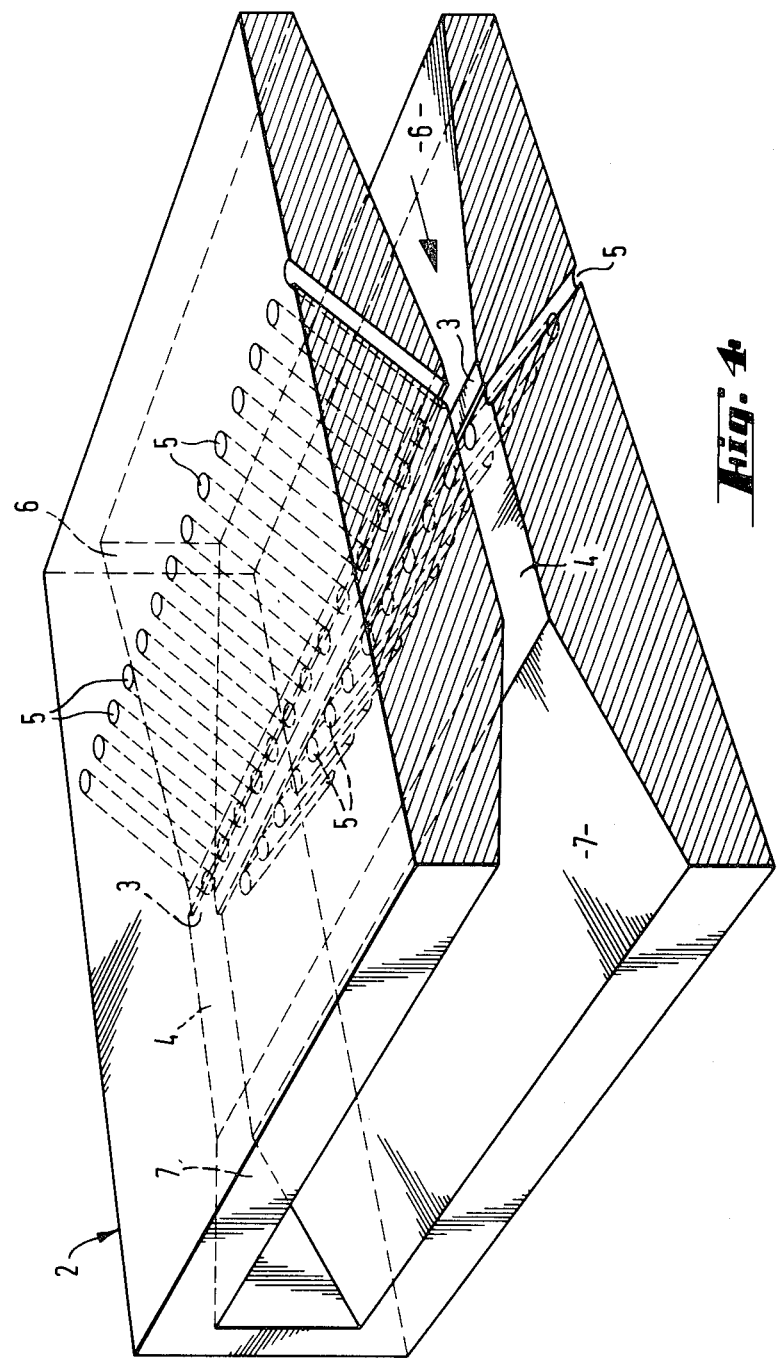
FIG. 4 is a perspective sectional view of the injector.

The injectors 2 are constructed as wide slot injectors, as best seen in FIG. 4. A nozzle feed pipe 6 is formed with a wedge-shaped configuration and opens into the wide slot nozzle 3 at which a mixing chamber 4 adjoins. Aeration bores 5 are connected with the aeration line 10 and extend into the mixing chamber 4. The diffuser 7 is connected with the wall of the flotation cell 1 and projects into the flotation cell. The injectors are distributed over the entire periphery of the flotation cell 1 in such a way that the entire surface is covered, i.e., they are arranged at different angles so that they cover the entire annular width of the cell 1 with three injectors having a nozzle width of 75 mm being provided. The injectors have a nozzle height of 5 mm. Consequently, the cross-sectional area thereof is $5 \times 75$ mm = 375 mm$^2$. The periphery is $2 \times (75+5) = 160$ mm, and the ratio of cross-sectional area to periphery is $375 \div 160 = 2.2$ mm.

Figure 5:
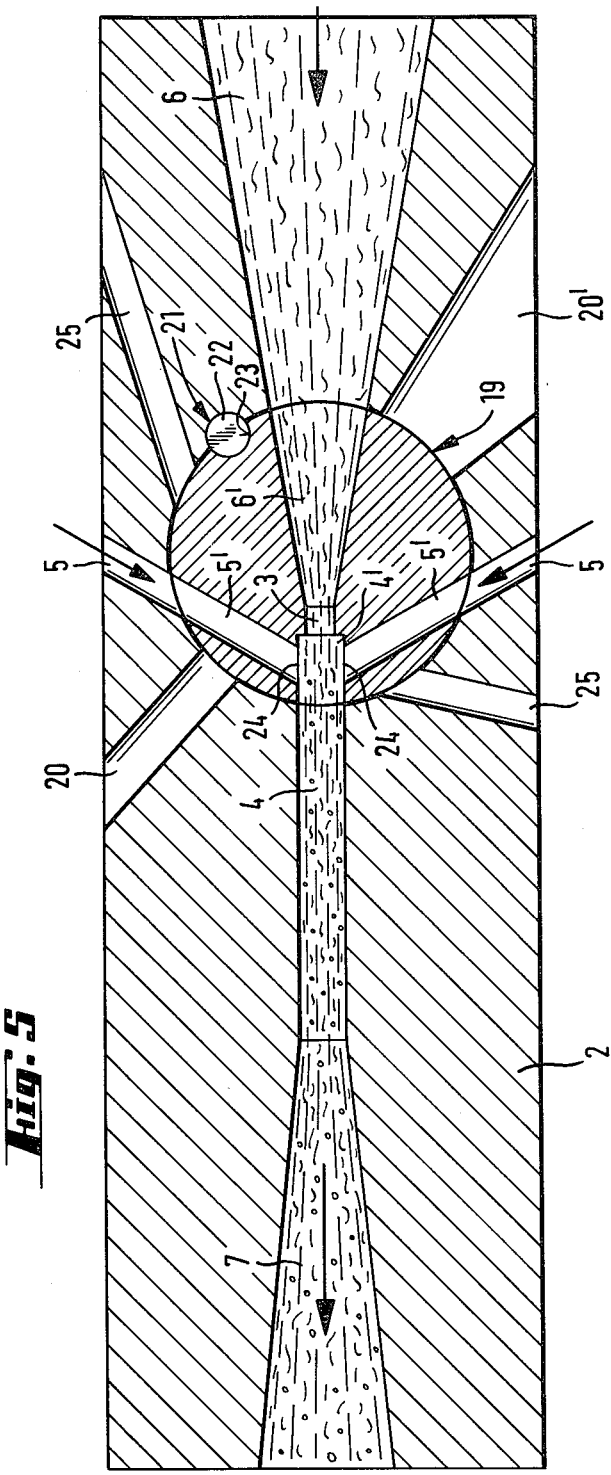
FIG. 5 is a sectional view taken through an injector having a rotary insert shown in the operative position.
Figure 6:
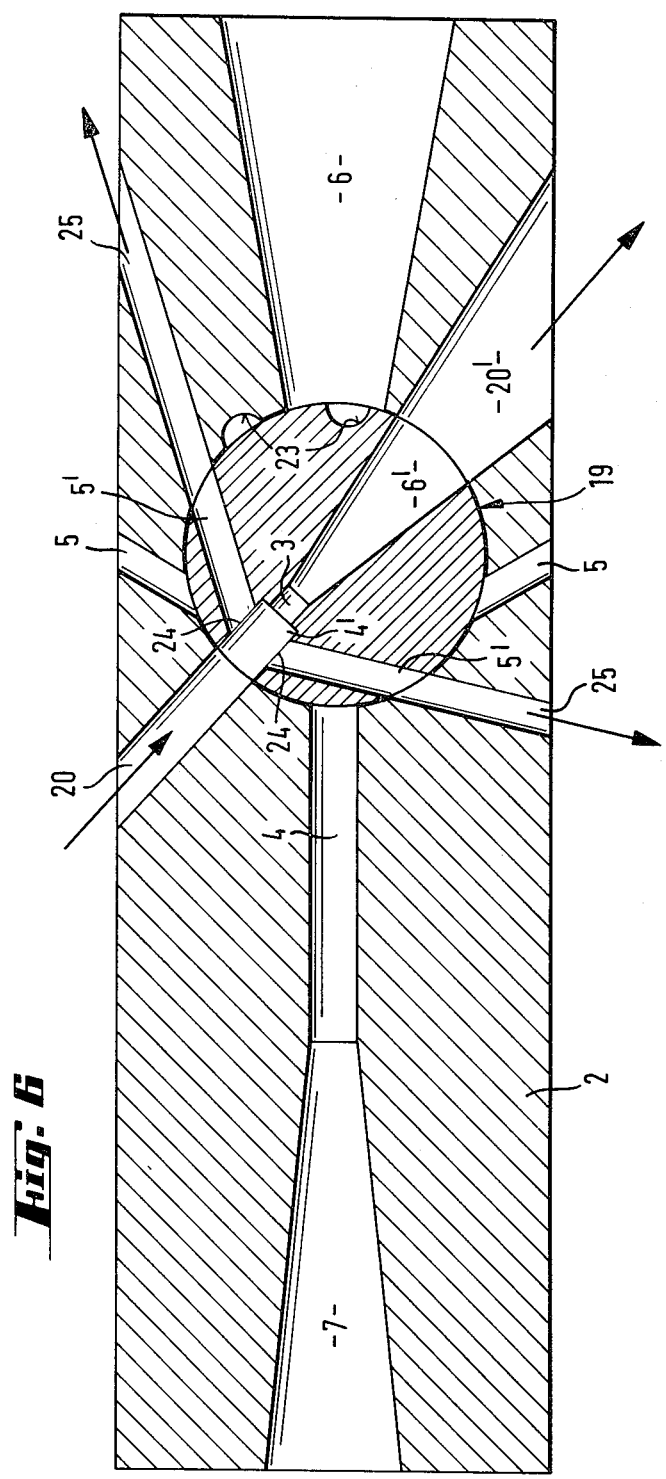
FIG. 6 is a sectional view showing the injector of FIG. 5 with the rotary insert in the cleaning position.

In the embodiment according to FIGS. 5 and 6, an insert 19 is arranged within the casing of the injector 2 and the insert is constructed as a truncated cone. In the operative position of the insert shown in FIG. 5, pulp suspension to be aerated enters the injector 2 through the nozzle feed pipe 6. The nozzle feed pipe 6 narrows in a direction toward the injection nozzle 3 wherein a nozzle feed section 6' is located inside the insert 19. From the top side and bottom side of the casing of the injector 2, aeration bores 5 extend through the casing of the injector 2 and continue inside the insert 19 as aeration bores 5'. Here they reach the mixing chamber 4 which, in the region of the insert 19, forms mixing chamber extensions 4'. When the aeration bores 5' enter the mixing chamber extensions 4', a discharge 24 of the aeration bores 5, 5' results. The diffuser 7 adjoins the mixing chamber 4 and is connected with a flotation cell (not shown). A locking mechanism 21 is provided which consists of an alignment pin 22 which is located in a stop bore 23 which extends parallel to the surface of the insert 19.

FIG. 6 shows the injector 2 with an insert 19 which has been rotated through approximately 40° with respect to the operative position thereof. The aeration bores 5 as well as the mixing chamber 4 and the nozzle feed pipe 6 are blocked by the insert 19. The mixing chamber extension 4' is in engagement with a cleaning opening 20 and the nozzle feed section 6' is connected with a cleaning opening 20'. The bores 5' align with blast openings 25. The cleaning opening 20 is acted upon with pressurized water or compressed air which, at the same time, is conducted through the blast or exhaust openings 25 and, after passing through the injection nozzle 3, against the flow direction of the pulp suspension through the cleaning opening 20'.

In this manner, any fiber material which is stuck or jammed in this region is flushed out and the injection nozzle 3 will again be ready for continued operative use.

While specific embodiments of the invention have been shown and described in detail to illustrate the application of the inventive principles, it will be understood that the invention may be embodied otherwise without departing from such principles.

What is claimed is:

1. In flotation apparatus for de-inking of pulp suspension including a flotation cell and injectors for feeding said pulp suspension therethrough into said cell and for aerating said pulp suspension, the improvement comprising that said injectors are formed to define a wide slot nozzle having a generally rectangular configuration with a width dimension and a height dimension, said nozzle being dimensioned with a ratio of cross-sectional area to periphery of between 1.5 and 4 and that a generally rectangular mixing chamber receiving pulp suspension from said wide slot nozzle is provided adjacent said nozzle, said mixing chamber having a cross-sectional area which is between 1.3 to 1.7 times the cross-sectional area of said wide slot nozzle.

2. Apparatus according to claim 1 wherein said injector is provided with aeration bores in flow communication with said mixing chamber having a total cross-sectional area which is between 1.1 to 1.4 times the air suction cross-sectional area of said mixing chamber.

3. Apparatus according to claim 1 or 2 wherein aeration bores are arranged in said injector at an angle of approximately 30° to 60° with respect to the direction of flow of pulp suspension therethrough.

4. Apparatus according to claim 3 wherein said wide slot nozzle, the discharge of said aeration bores and at least a partial region of said mixing chamber are located within an insert which is mounted in said injector.

5. Apparatus according to claim 4 wherein said insert comprises a rotatably supported member having one of a cylindrical or conical configuration.

6. Apparatus according to claim 3 wherein said injector is formed with a casing which is provided with cleaning openings or enabling cleaning of said wide slot nozzle and said aeration bores.

7. Apparatus according to claim 4 wherein said injector is formed with a casing which is provided with stops for determining an operative position and a cleaning position of said insert.

8. Apparatus according to claim 4 wherein said injector is formed with a casing which is provided with a locking mechanism for affixing said insert in operative position.

* * * * *